Figure 1:
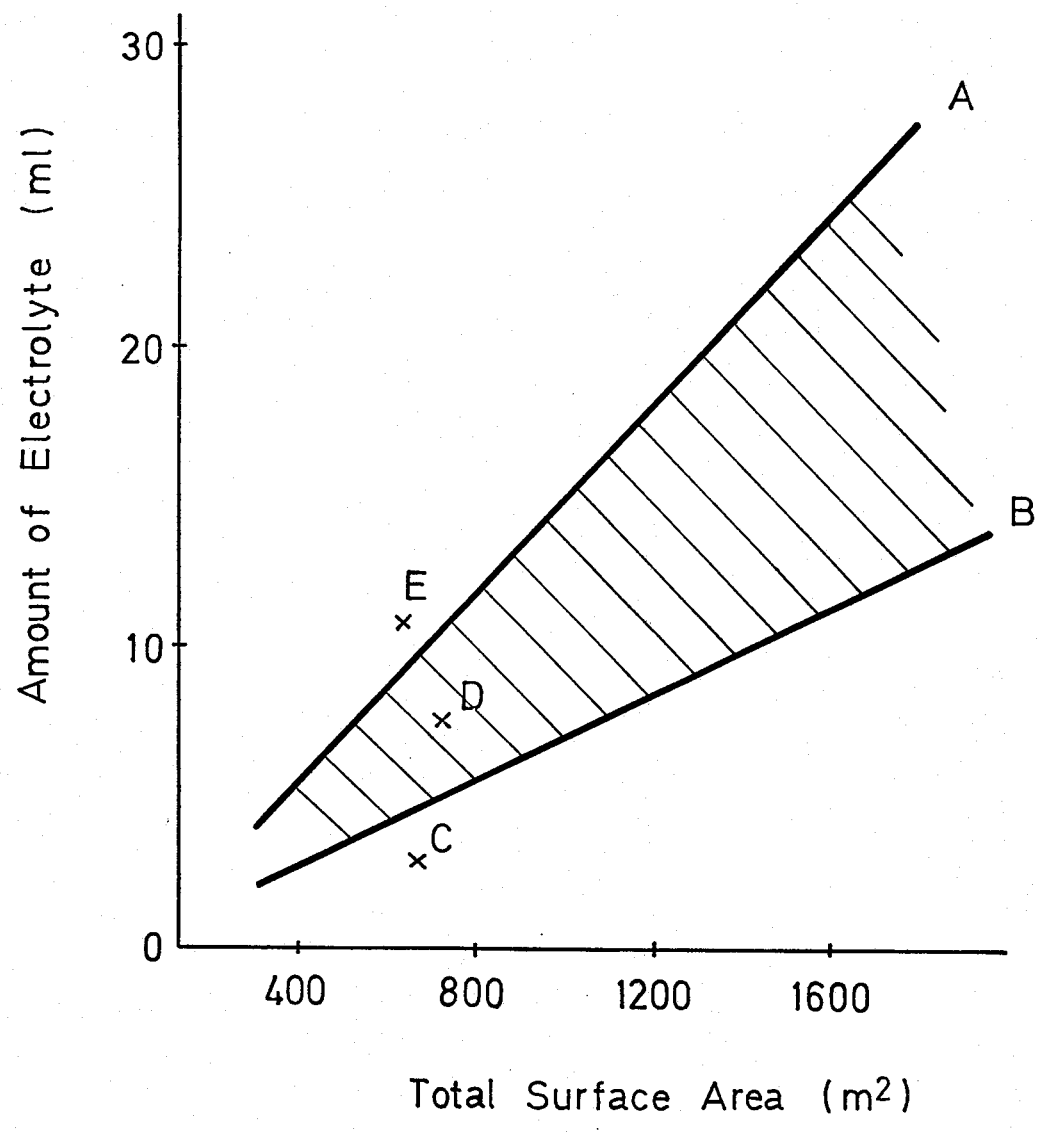

United States Patent [19]
Uftani et al.

[11] 3,874,932
[45] Apr. 1, 1975

[54] DRY CELLS
[75] Inventors: Yoshio Uftani; Rokurou Ikebata; Takayuki Togo; Tugiyasu Iwamaru, all of Osaka, Japan
[73] Assignee: Hitachi Maxell, Ltd., Osaka, Japan
[22] Filed: June 15, 1973
[21] Appl. No.: 370,433

[52] U.S. Cl. .................................. 136/103, 136/138
[51] Int. Cl. ............................................ H01m 17/00
[58] Field of Search ........... 136/103, 102, 123, 107, 136/138, 155, 157

[56] References Cited
UNITED STATES PATENTS

| | | | |
|---|---|---|---|
| 1,292,764 | 1/1919 | Hambuechen | 136/103 |
| 3,019,141 | 1/1962 | Priebe | 136/155 |
| 3,098,771 | 7/1963 | Huber | 136/103 |
| 3,428,494 | 2/1969 | Watanabe et al. | 136/102 |
| 3,440,104 | 4/1969 | Huber | 136/103 |

Primary Examiner—Anthony Skapars
Attorney, Agent, or Firm—Stewart and Kolasch, Ltd.

[57] ABSTRACT

A dry cell comprising a zinc anode, a depolarizing mix and a separator which functions to separate the anode from the depolarizing mix, said depolarizing mix containing manganese dioxide as its main component and acetylene black immersed in an electrolyte having zinc chloride as its main ingredient, said depolarizing mix containing water and chlorine in an amount of about 50 to 90 parts by weight and about 5.5 to 14.5 parts by weight, respectively, per 100 parts by weight of manganese dioxide, the chlorine being present in the form of said zinc chloride or zinc chloride with added hydrochloric acid; said depolarizing mix also containing said electrolyte in an amount in millimeters determined by multiplying the BET total surface area of manganese dioxide and acetylene black in m²/gram by a value of about 0.008 to 0.015, and said depolarizing mix further containing the electrolyte in an amount of about 2 to 4 ml. per gram of acetylene black.

17 Claims, 3 Drawing Figures

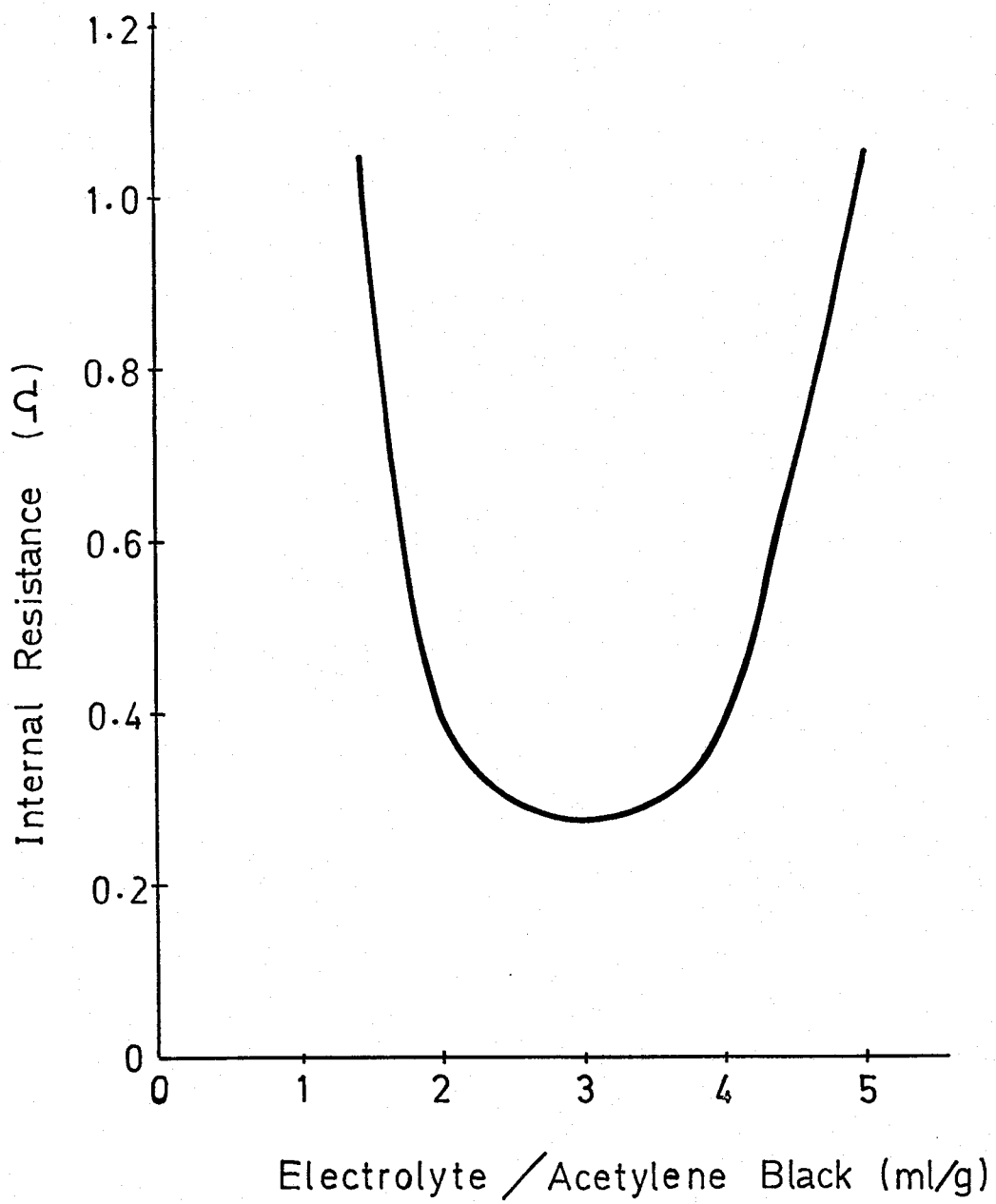

DRY CELLS

The present invention relates to a dry cell. More particularly, it relates to improvements in a dry cell containing a zinc anode and a depolarizing mix, the depolarizing mix containing as its main component manganese dioxide immersed in an electrolyte. The electrolyte has zinc chloride as its main ingredient. The improved dry cell of the present invention possesses an increased cell efficiency.

In conventional Leclanche-type dry cells, ammonium chloride has been used as the main electrolyte. A generally accepted cell reaction is as follows:

$$2MnO_2 + Zn + 2NH_4Cl \rightarrow Mn_2O_3 + H_2O + Zn(NH_3)_2Cl_2$$

As calculated from the above cell reaction, the amount of ammonium chloride necessary is about 61 parts by weight per 100 parts by weight of manganese dioxide. Such a large amount of ammonium chloride cannot be added as a liquid electrolyte. Thus the additional amount thereof should be added in the solid form by tempering the depolarizing mix with the solid ammonium chloride and molding it into a shape. The addition of such a large amount of the ammonium chloride to conventionally employed dry cells naturally results in limiting the amount of active material of the cathode or manganese dioxide and the conductive adjunct or acetylene black to be added. During discharge it also causes the formation of zinc diamine chloride, $Zn(NH_3)_2Cl_2$, etc., in and around the depolarizer mix. The zinc diamine chloride thus formed prevents the diffusion of ions and electronic conduction in the depolarizing mix, resulting in an increase in the internal resistance of the dry cells. Thus the cell efficiency is adversely affected.

In order to diminish these defects, it has been proposed to limit the amount of the water in the depolarizing mix within a ratio of 23 to 39 per cent by weight by tempering the depolarizing mix with an electrolyte of a water solution of zinc chloride to an extent of 15 to 40 per cent by weight. Another proposed improvement restricts the amount of electrolyte in the depolarizer mix to about 60 to 71 per cent by weight by tempering the depolarizing mix with an electrolyte of zinc chloride solution. The proposed dry cells have an improved cell efficiency to some extent, but they are not yet satisfactory.

Even with the water ratio in the depolarizing mix set within the same range as when using the electrolyte in the same concentration as proposed, a favorable cell efficiency is not attained by itself. If there is a lack of chlorine necessary for the cell reaction or an unbalanced presence of the amounts of chlorine and water in the depolarizing mix, the availability of manganese dioxide is impaired. This increases the internal resistance of the cells, which diminishes the cell efficiency.

Under the same conditions as set forth hereinabove, a favorable cell efficiency may not necessarily be obtained because of an unstable efficiency which results from an inadequate mixing ratio and an inadequate ratio of the specific surface areas of manganese dioxide and acetylene black to be employed.

Furthermore, in the above proposed improvements no considerations have been made as to the amount of electrolyte in the depolarizing mix with respect to acetylene black working as a carrier of the electrolyte.

As the results of extended studies, it has been found that solid ammonium chloride, which had been heretofore added in a large amount to the depolarizing mix, is not a required material for the cell reaction. Rather, it limits the amount of manganese dioxide and acetylene black to be filled and produces zinc diamine chloride which causes an increase in the internal resistance of the dry cell. It has also been found that a high concentration of the ammonium chloride in the electrolyte impairs the surface wettability of acetylene black, etc., when the depolarizing mix is tempered with the electrolyte, so that the concentration of ammonium chloride in the depolarizer mix should be as low as possible. In order to secure stable discharge characteristics and the proper discharge capacity of dry cells, it has been found necessary for manganese dioxide, acetylene black, and an electrolyte to be present together in an appropriate ratio.

Accordingly, it is an object of the present invention to provide a dry cell with an increased cell efficiency.

Another object of the present invention is to provide a dry cell having a depolarizing mix which contains manganese dioxide, water, and chlorine in an appropriate ratio.

A further object of the present invention is to provide a dry cell wherein manganese dioxide, acetylene black, and an electrolyte are present in an appropriate ratio.

Other objects, features and advantages of the present invention will become apparent during the course of the following description, the claims, and the accompanying drawings.

Table 1 shows the amounts, expressed in parts by weight, of manganese dioxide, acetylene black, zinc chloride, ammonium chloride and water in the depolarizing mix tempered in various ratios with an electrolyte containing zinc chloride as its main component. The table also contains the amounts of water and chlorine in parts by weight per 100 parts by weight of the manganese dioxide in the depolarizing mix.

Among these test dry cells, dry cell G is a conventional one having ammonium chloride as the main electrolyte, and it is used for comparative purposes.

Table 2 shows the discharge duration of time tested with UM-2 dry cells having the same components as

TABLE 1

| Components | Dry Cells, parts by weight | | | | | | |
|---|---|---|---|---|---|---|---|
| | A | B | C | D | E | F | G |
| Manganese dioxide | 11 | 13 | 12 | 10 | 10 | 8 | 10 |
| Acetylene black | 2 | 2.6 | 2.4 | 2 | 2 | 1.6 | 2 |
| Zinc chloride | 0.9 | 1.8 | 1.3 | 2 | 2.6 | 1.3 | 1.5 |
| Ammonium chloride | 0.5 | 0.5 | 0.3 | 0.5 | 0.6 | 1 | 4 |
| Water | 8 | 5.2 | 7.2 | 7.5 | 8 | 8 | 4 |
| Water ($H_2O/MnO_2$) | 73 | 40 | 60 | 75 | 80 | 100 | 40 |
| Chlorine ($Cl/MnO_2$) | 4.3 | 7.2 | 5.6 | 10.4 | 13.5 | 8.5 | 7.8 | shown in Table 1. The tests were carried out by discharging at a load resistance of 4 ohms until the terminal voltage reached 0.85 volt. The test results that were obtained on a continuous drain are shown as I and that obtained on an intermittent drain, where the discharge was made for 30 minutes a day, is shown as II.

TABLE 2

| Discharge Duration, minutes | Dry Cells Tested | | | | | | |
|---|---|---|---|---|---|---|---|
| | A | B | C | D | E | F | G |
| I | 300 | 250 | 320 | 350 | 320 | 270 | 200 |
| II | 300 | 300 | 400 | 450 | 430 | 320 | 400 |

As shown in Table 2, the tested dry cells D and E are superior to the cells A, B, F and G in cell characteristics on both continuous and intermittent drain. The test dry cell C is more effective on continuous drain than the latter.

The test dry cells A and B contain in the depolarizing mix a solid ammonium chloride in a lesser amount than cell G and, therefore, contain a larger amount of manganese dioxide and acetylene black. However, during discharge the cell A permits products containing predominantly $Zn(OH)_2$ to be formed and sedimented because of the lack of chlorine content in the depolarizer mix. On the other hand, the cell A is sedimented with products containing mainly $ZnCl_2.Zn(OH)_2$ and/or $ZnCl_2.4Zn(OH)_2$ because of the lack of water in the depolarizing mix even though the chlorine content is sufficient. These products sedimented in the depolarizing mix prevent the diffusion of ions causing an increase in the internal resistance of the cell, which prevents the manganese dioxide from working to its full extent. In the test dry cells C, D, and E, there are formed upon discharge, water-rich products such as $ZnCl_2.4ZnO.11-H_2O$ which serve to maintain the favorable ionic conductivity in the depolarizing mix even at the last stage of discharge. This may keep the availability of the manganese dioxide at a high level and produce an increased cell efficiency. For the test cell F, since the amount of water with respect to manganese dioxide is too large in the depolarizing mix, the amount of manganese dioxide and acetylene black required necessarily a sufficient cell efficiency.

It has now been found that it is desirable to limit the amount of water to a range of about 50 to 90 parts by weight and the amount of chlorine to about 5.5 to 14.5 parts by weight based on 100 parts by weight of manganese dioxide. Within these preferred ranges, the discharge reaction takes place without an increase in the internal resistance, which is maintained as low as possible. At the same time, the availability of the manganese dioxide is increased.

Besides zinc chloride, the chlorine necessary for the cell reaction may also be provided in the form of hydrochloric acid which is added to the zinc chloride. Where zinc flowers or ZnO is added to the depolarizing mix, the hydrochloric acid may be reacted partially with the zinc flowers to give zinc chloride. The reaction is as follows:

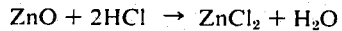

$$ZnO + 2HCl \rightarrow ZnCl_2 + H_2O$$

It has been further found that there is a close relationship between the surface areas of manganese dioxide and acetylene black and the amount of the electrolyte to be filled. This relationship also may affect to a great extent the cell efficiency because the electrolyte is retained with manganese dioxide and acetylene black in the depolarizing mix. It has accordingly been found advantageous to adjust the amount of the electrolyte to be added to the depolarizer mix in accordance with the total surface areas of the solid ingredients of the depolarizer mix. An ideal condition of the depolarizing mix is that the acetylene black particles wrap up the manganese dioxide particles and then the former are situated in succession and the electrolytes are also present successively with each other. Even if the weight ratio of the amount of electrolyte with respect to the depolarizing mix is constant, the solid ingredients of the depolarizer mix may not be fully wrapped up by the electrolyte, where the total surface areas of the manganese dioxide and acetylene black are very large. It therefore follows that the electrolytes are not situated so successively that an adverse effect on the ionic conductivity of the depolarizing mix is produced. Where the total surface areas of the two components are too small, the electronic conductivity in the depolarizing mix decreases because the depolarizer mix is impregnated into its contact surfaces with the surplus of the electrolyte.

In accordance with the present invention, manganese dioxide may have a BET surface area of about 30 to 120 m²/gram, and acetylene black may have a BET surface area of about 50 to 90 m²/gram. The mixing ratio, by weight, of the two components manganese dioxide and acetylene black may be advantageously selected from about 4/1 to 9/1. Using the manganese dioxide and acetylene black having the same surface areas as mentioned above at their various proportions, UM-2 dry cells were assembled by adding an electrolyte containing zinc chloride as the main ingredient. These UM-2 dry cells were tested with respect to the relationship in the cell efficiency between the total surface areas of both the manganese dioxide and acetylene black, and the amount of electrolyte in the depolarizing mix.

FIG. 1 shows the relationship of the total surface areas of manganese dioxide and acetylene black with the amount of electrolyte in the depolarizer mix. As shown in said figure, the area indicated by oblique lines between the two solid straight lines A and B is the zone where a favorable cell efficiency can be obtained when manganese dioxide and acetylene black are present in the correct proportion with respect to the electrolyte. Within this area, the internal resistance also may be maintained at a low level. It now has been found that the amount of electrolyte within the area between the two solid lines A and B may be calculated by multiplying the total surface areas of both the manganese dioxide and acetylene black by a value K having a range of about 0.008 to 0.015. The addition of the electrolyte in an amount above the line A produces an excessive amount of electrolyte in the depolarizing mix and thus decreases the electronic conductivity. An amount of electrolyte corresponding to the area below the line B reduces the amount of electrolyte in the depolarizer mix, which causes a decrease in the ionic conductivity.

Figure 2:
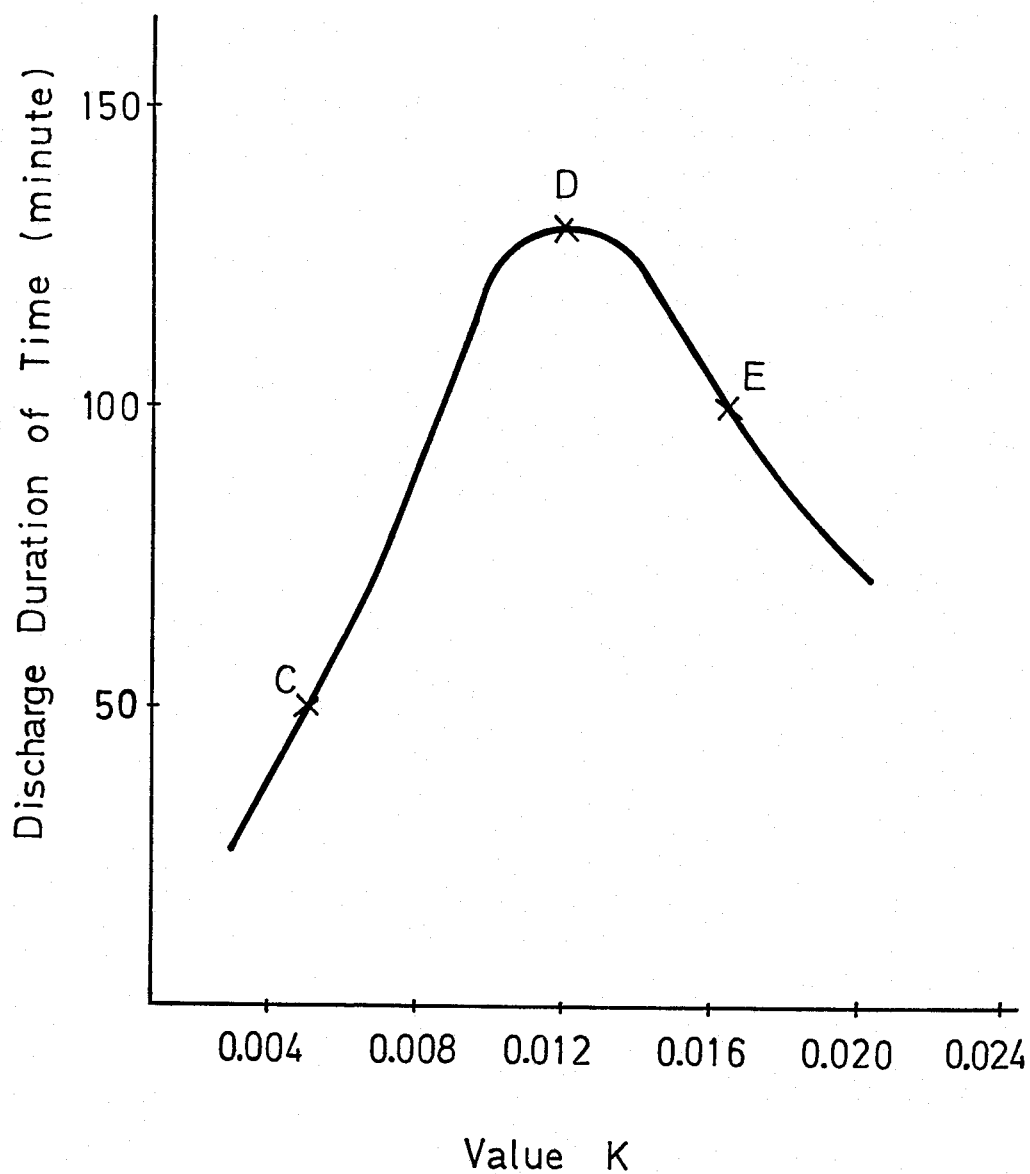

FIG. 2 shows the relationship of the value K with respect to the discharge duration of time of the tested UM-2 dry cells. The dry cells tested were assembled by using 11 g. of manganese dioxide having a BET surface area of 50 m²/g. and 2 g. of acetylene black having a BET surface area of 70 m²/g. and by adding the electrolyte in an amount determined by multiplying the total surface areas of the two components by the value K between O and 0.020. The test was carried out at a continuous discharge of 4 ohms with respect to the K values and the discharging was continued until the terminal voltage was down to 0.9 volt. The dry cells which came within the range of the value K of about 0.008 to 0.015 advantageously had a longer discharge duration period of time and a higher short-circuit current value when compared with those which fell out of said range. As shown in FIGS. 1 and 2, the letter C indicates a dry cell which was assembled by using an electrolyte calculated by using a multiplication factor of 0.005, D represents a dry cell using a factor of 0.012, and E represents a dry cell using a factor of 0.017.

It has been further found to be desirable to mix the manganese dioxide, the acetylene black, and the electrolyte in the proper proportion in the depolarizing mix. The following example shows a composition of the depolarizing mix:

TABLE 3

| Components of the Depolarizing Mix | Weight, per cent | Volume, per cent |
|---|---|---|
| Manganese dioxide | 55.6 | 26.6 |
| Acetylene black | 6.4 | 8.0 |
| Zinc hydroxide | 6.8 | 0.6 |
| 6N Zinc chloride solution | 37.2 | 64.8 |

As calculated from the above composition, about 4.5 ml. of the electrolyte is present for every 1 g. of acetylene black. Such a large amount of the electrolyte is not advantageous because of the increase in the internal resistance.

FIG. 3 shows the relationship of the amount of electrolyte with respect to 1 g. of acetylene black to the internal resistance. The UM-2 dry cells tested were assembled by tempering a mixture of manganese dioxide and acetylene black having a mixing ratio (manganese dioxide/acetylene black) of 4.5/1 by weight with an electrolyte containing 20 per cent by weight of zinc chloride and 5 per cent by weight of ammonium chloride.

As will be apparent from FIG. 3, the internal resistance of the dry cells tested is relatively low where about 2 to 4 ml. of the electrolyte was added with respect to 1 g. of acetylene black. Particularly within the range of about 2.5 to 3.8 ml. of the electrolyte added, the internal resistance of the cells was constantly maintained at the lowest level. The addition of the electrolyte in an amount of less than 2 ml. with respect to 1 g. of acetylene black diminished the ionic conductivity in the depolarizing mix. Where more than 4 ml. of the electrolyte was added with respect to 1 g. of acetylene black, the electrolyte was held between the surfaces of the acetylene black particles where they are in contact with each other. This increases to some extent the contact resistance between the depolarizer particles and thus limits the electronic conductivity, causing an increase in the internal resistance of the dry cells. Such a tendency was ascertained experimentally with the concentration of zinc chloride and/or the ratio of manganese dioxide and acetylene black slightly changed. It now has been found that it is desirable to use the electrolyte in the depolarizing mix in an amount of about 2 to 4 ml. with respect to 1 g. of acetylene black. Within the preferred range, the dry cells of the present invention raise the availability of manganese dioxide to a high level while favorably maintaining the ionic and electronic conductivities in the depolarizer mix and reducing the internal resistance.

Table 4 shows the amounts of the ingredients in the depolarizing mixes, the ingredients being manganese dioxide, acetylene black, zinc chloride, ammonium chloride and water. It also shows the amounts of the electrolyte with respect to 1 g. of acetylene black. The depolarizing mix was made by tempering with an electrolyte containing 20 per cent by weight of zinc chloride and 5 per cent by weight of ammonium chloride at a variety of ratios.

TABLE 4

| Ingredients | Test Dry Cells | | | |
| | A | B | C | D |
|---|---|---|---|---|
| Manganese dioxide, g. | 12.3 | 11.2 | 8.8 | 9.5 |
| Acetylene black, g. | 2.3 | 2.1 | 1.6 | 2.3 |
| Zinc chloride, g. | 0.9 | 1.5 | 1.7 | 0.8 |
| Ammonium chloride, g. | 0.2 | 0.4 | 0.4 | 3.2 |
| Water, g. | 3.3 | 5.8 | 6.5 | 2.6 |
| Electrolyte, ml./g. | 1.6 | 3.1 | 4.5 | 1.6 |

In the table the test dry cell D is a conventional one containing ammonium chloride as the main electrolyte and is used for comparison.

Table 5 shows the short circuit currents and the discharge duration of time when these test dry cells were discharged at a load resistance of 4 ohms until the terminal voltage was down to 0.85 volt. The discharge duration of time was also tested with test cells under the same conditions as stated above except that the discharge was made intermittently for 30 minutes a day. The test results are shown in the table:

TABLE 5

| Results | Dry Cells Tested | | | |
| | A | B | C | D |
|---|---|---|---|---|
| Short Circuit Current, A | 5.2 | 7.5 | 4.8 | 5.3 |
| Continuous Discharge Duration of Time, minutes | 220 | 350 | 270 | 200 |
| Intermittent Discharge Duration of Time, minutes | 390 | 450 | 320 | 400 |

In a dry cell A, the amount of the electrolyte was too small for acetylene black and vice versa in dry cell C, leading to an increase in the internal resistance of the cells and thus impairing the cell efficiency. The test dry cell B possessed the higher short circuit current and the longer discharge duration of time than the other cells because acetylene black and the electrolyte were added at a desirable ratio, providing a cell with the advantageous ionic and electronic conductivities and thus maintaining a low internal resistance.

In considering the electrolyte to be used according to the present invention, it was found that a zinc chloride concentration of below 13 per cent by weight does not enable the paste material to become fully solidified and does not permit the paste layer to maintain its viscosity and stability. Such dry cells may lose their ability to retain the electrolyte during long storage. The ionic conductivity also may be decreased. A zinc chloride concentration of above 27 per cent by weight tends to prevent the diffusion of ions accompanying the discharge reaction and to diminish the cell efficiency. Where more than 10 per cent by weight of ammonium chloride is used in the depolarizer mix, zinc diammine chloride may be formed under some discharge conditions, which may cause the same disadvantages as those that conventional dry cells containing the ammonium chloride as the main electrolyte possess. Although ammonium chloride is not a requisite material for the cell reaction, it is preferred to use about 2 to 8 per cent by weight of ammonium chloride. It may be particularly desirable to use ammonium chloride at times when zinc chloride is hydrolyzed and sedimented as its basic salts in an electrolyte having zinc chloride as the main component. Thus it may be advantageous to employ in the electrolyte of the present invention, zinc chloride in an amount of about 13 to 27 per cent by weight and ammonium chloride in a concentration of less than about 10 per cent by weight, preferably about 2 to 8 per cent by weight. The electrolyte of the present invention having such a composition functions to uniformly coat the many complex surfaces of the manganese dioxide and the acetylene black particles, said particles and said electrolyte being uniformly distributed. Using the acetylene black and the electrolyte in the same mixing ratio as that to be used in the present invention by tempering the depolarizer mix with a conventional electrolyte having ammonium chloride as the main component, the depolarizing mix may become very sticky and may not be handled easily. However, the use of an electrolyte having such a composition as stated above efficiently expedites the operation without troublesome handling problems.

In the depolarizing mix of the present invention, the amounts of electrolyte and water are higher than those of conventional paste-type cells. Accordingly, the depolarizing mix may be preferably adopted for paper-lined dry cells and paste-layer dry cells. The paper-lined dry cells have a structure in which a porous material such as kraft paper is disposed between the zinc can and the depolarizing mix. The paste-layer dry cells have the depolarizing mix tamped into a zinc can previously coated with a paste to form the paste layer on the interior side of the can. When the present invention is used for paper-lined dry cells, it may be preferred to apply a paste in a ratio of about 8 to 70 g./m² to the separator. Where the amount of the paste material is less than 8 g./m², electrolyte retained in the separator may be adsorbed during storage, thereby impairing the storage capacity. When more than 70 g./m² is employed, the discharge efficiency on continuous overload drain may decrease.

In accordance with the present invention, manganese dioxide and acetylene black may be advantageously mixed together in the depolarizing mix in a ratio by weight of about 4/1 to 7/1 of manganese dioxide to acetylene black. The addition of acetylene black in a ratio of more than 4/1 necessarily decreases the amount of active material, manganese dioxide, to be added. Where the ratio of acetylene black is less than 7/1, the internal resistance of the depolarizer mix tends to increase. The acetylene black functions to provide the depolarizer mix with favorable conduction and retain the electrolyte therein.

According to the present invention, the preferred amount of electrolyte is about 2 to 6 parts by weight per one part by weight of acetylene black. An insufficient amount of electrolyte may impair the reaction of manganese dioxide and diminish the ionic conductivity of the depolarizing mix as a whole. On the contrary, an excessive amount of electrolyte is not desirable for the electronic conductivity of the dry cells. A surplus of the electrolyte may be impregnated into the contact surfaces between the depolarizer mix particles which increases the contact resistance between the particles.

The following examples serve to be illustrative of the present invention, but are not to be considered as limiting.

EXAMPLE 1

A mixture of 82 g. of manganese dioxide, 18 g. of acetylene black and 1.3 g. of zinc flowers was gradually added, while stirring, to 45 g. of an electrolyte containing 20 parts by weight of zinc chloride and 5 parts by weight of ammonium chloride. After the manganese dioxide and acetylene black were fully immersed, a depolarizing mix was prepared by taking 18 g. from such a mixture and molding it into a cylindrical shape having a diameter of 19 mm. and a length of 30 mm.

A piece of kraft paper was coated on its one side with a paste material such as starch or methyl cellulose in an amount of 40 g. per square meter to form a paste layer. A separator made of this material was inserted into the zinc can with the paste material layer facing the inner wall of the can and being in contact with said can.

The cylindrically shaped depolarizing mix was then put into the can. Then, 4.7 g. of said electrolyte was poured onto the depolarizing mix and at the same time, immersed into the separator, functioning to solidify the paste material. A carbon rod was then forced upright into the center of the depolarizer mix, and a dry cell was assembled by conventional procedures.

The UM-2 dry cell in the depolarizing mix, manganese dioxide and acetylene black in a ratio of 4.5/1 by weight of manganese dioxide to acetylene black, water in an amount of about 74 parts by weight and chlorine present as zinc chloride in an amount of about 10 parts by weight per 100 parts by weight of manganese dioxide. The electrolyte is present in an amount of about 4.5 parts by weight per one part by weight of acetylene black.

The UM-2 dry cell possesses the following advantageous cell characteristics:

TABLE 6

| Discharge Conditions | Discharge Duration of Time |
| --- | --- |
| Continuous Discharge at 2 ohms | 130 minutes |
| Intermittent Discharge at 2 ohms | 180 minutes |
| Continuous Discharge at 75 ohms | 170 hours |
| Intermittent Discharge at 75 ohms | 170 hours |

EXAMPLE 2

A depolarizing mix was prepared with 19 g. of the same mixture as produced in Example 1. A UM-2 dry cell was assembled by the same procedures as mentioned above.

The dry cell contains manganese dioxide and acetylene black in a ratio, by weight, (manganese dioxide/acetylene black) of 82/18 and about 3.3 ml. of the electrolyte per gram of acetylene black.

The dry cell possessed the same cell characteristics as those obtained in Example 1 and shown in Table 6.

EXAMPLE 3

11 g. of manganese dioxide having a BET surface area of 50 m$^2$/g. was mixed with 2 g. of acetylene black having a BET surface area of 70 m$^2$/g. The total surface of this mixture is: $50 \times 11 + 70 \times 2 = 690$ (m$^2$). The amount of electrolyte was 8.28 ml. which was determined by multiplying the total surface area thereof by 0.012. Of the 8.28 ml. of the electrolyte to be added, 5.0 ml. was added to said mixture to immerse the manganese dioxide and acetylene black. Then, the depolarizer mix was molded into a cylindrical shape having a 19 mm. diameter and a 30 mm. length.

The depolarizing mix was placed in a zinc can containing a separator prepared by the same procedures as in Example 1. Onto the depolarizing mix placed in the can, was poured an additional 3.28 ml. of the electrolyte. The dry cell was then assembled in the same manner as stated above.

The UM-2 dry cell also exhibited the same characteristics as those produced in Example 1 and shown in Table 6.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A dry cell comprising a zinc anode, a depolarizing mix and a separator which functions to separate the anode from the depolarizing mix, said depolarizing mix containing manganese dioxide as its main component and acetylene black immersed in an electrolyte having zinc chloride as its main ingredient, said depolarizing mix containing water and chlorine in an amount of about 50 to 90 parts by weight and about 5.5 to 14.5 parts by weight, respectively, per 100 parts by weight of manganese dioxide, the chlorine being present in the form of said zinc chloride or zinc chloride with added hydrochloric acid.

2. A dry cell having a zinc anode, an electrolyte containing zinc chloride as its main ingredient, and a depolarizing mix containing a mixture of manganese dioxide, acetylene black, and said electrolyte, said depolarizing mix containing water and chlorine in an amount of about 50 to 90 parts by weight and about 5.5 to 14.5 parts by weight, respectively, per 100 parts by weight of manganese dioxide, the electrolyte being present in said depolarizing mix in an amount in milliliters determined by multiplying the BET total surface area of manganese dioxide and acetylene black in m$^2$/gram by a value of about 0.008 to 0.015.

3. A dry cell having a zinc anode, an electrolyte containing zinc chloride as its main component, and a depolarizing mix containing a mixture of manganese dioxide, acetylene black, and said electrolyte, said depolarizing mix containing the electrolyte in an amount of about 2 to 4 ml. per gram of acetylene black, the content of water and chlorine in said depolarizing mix being about 50 to 90 parts by weight and about 5.5 to 14.5 parts by weight, respectively, per 100 parts by weight of manganese dioxide.

4. The dry cell of claim 1, wherein the concentration of zinc chloride in the electrolyte is about 13 to 27 parts by weight.

5. The dry cell of claim 2, wherein the concentration of zinc chloride in the electrolyte is about 13 to 27 parts by weight.

6. The dry cell of claim 3, wherein the concentration of zinc chloride in the electrolyte is about 13 to 27 parts by weight.

7. The dry cell of claim 1, wherein ammonium chloride is present in the electrolyte in an amount less than about 10 parts by weight.

8. The dry cell of claim 2, wherein ammonium chloride is present in the electrolyte in an amount less than about 10 parts by weight.

9. The dry cell of claim 3, wherein ammonium chloride is present in the electrolyte in an amount less than about 10 parts by weight.

10. The dry cell of claim 1, wherein the separator is coated with a paste material in an amount of about 8 to 70 g./m$^2$.

11. The dry cell of claim 10, wherein the paste material is starch or methyl cellulose.

12. The dry cell of claim 1, wherein the weight ratio of manganese dioxide to acetylene black is about 4/1 to 7/1.

13. The dry cell of claim 2, wherein the weight ratio of manganese dioxide to acetylene black is about 4/1 to 7/1.

14. The dry cell of claim 3, wherein the weight ratio of manganese dioxide to acetylene black is about 4/1 to 7/1.

15. A depolarizing mix for use in a dry cell comprising manganese dioxide as its main component and acetylene black immersed in an electrolyte having zinc chloride as its main ingredient, said depolarizing mix containing water and chlorine in an amount of about 50 to 90 parts be weight and about 5.5 to 14.5 parts by weight, respectively, per 100 parts by weight of manganese dioxide, the chlorine being present in the form of said zinc chloride or zinc chloride with added hydrochloric acid.

16. A depolarizing mix for use in a dry cell comprising a mixture of manganese dioxide, acetylene black, and an electrolyte having zinc chloride as its main ingredient, said depolarizing mix containing water and chlorine in an amount of about 50 to 90 parts by weight and about 5.5 to 14.5 parts by weight, respectively, per 100 parts by weight of manganese dioxide, the electrolyte being present in said depolarizing mix in an amount in milliliters determined by multiplying the BET total surface area of manganese dioxide and acetylene black in m$^2$/gram by a value of about 0.008 to 0.015.

17. A depolarizing mix for use in a dry cell comprising a mixture of manganese dioxide, acetylene black, and an electrolyte having zinc chloride as its main ingredient, said depolarizing mix containing the electrolyte in an amount of about 2 to 4 ml. per gram of acetylene black, the content of water and chlorine in said depolarizing mix being about 50 to 90 parts by weight and about 5.5 to 14.5 parts by weight, respectively, per 100 parts by weight of manganese dioxide.

* * * * *

UNITED STATES PATENT OFFICE
CERTIFICATE OF CORRECTION

Patent No. 3,874,932  Dated April 1, 1975

Inventor(s) Yoshio UETANI et al

It is certified that error appears in the above-identified patent and that said Letters Patent are hereby corrected as shown below:

In the list of inventors:

[75] Change "Uftani" to ....Uetani...

Signed and sealed this 24th day of June 1975.

(SEAL)
Attest:

RUTH C. MASON
Attesting Officer

C. MARSHALL DANN
Commissioner of Patents
and Trademarks